(12) United States Patent
Malhotra (10) Patent No.: US 9,247,184 B2
(45) Date of Patent: Jan. 26, 2016

(54) ENERGY SAVING CIRCUITS AND METHODS FOR MULTIMEDIA OVER COAXIAL ALLIANCE (MOCA) CAPABLE DEVICES

(71) Applicant: STMICROELECTRONICS, INC., Coppell, TX (US)

(72) Inventor: Tanu Malhotra, Schaumburg, IL (US)

(73) Assignee: STMicroelectronics, Inc., Coppell, TX (US)

( * ) Notice: Subject to any disclaimer, the term of this patent is extended or adjusted under 35 U.S.C. 154(b) by 281 days.

(21) Appl. No.: 13/912,164

(22) Filed: Jun. 6, 2013

(65) Prior Publication Data

US 2014/0362298 A1  Dec. 11, 2014

(51) Int. Cl.
  *G06F 1/32* (2006.01)
  *H04N 5/63* (2006.01)
  *H04N 21/436* (2011.01)
  *H04N 21/442* (2011.01)
  *H04N 21/443* (2011.01)

(52) U.S. Cl.
  CPC .......... *H04N 5/63* (2013.01); *H04N 21/43615* (2013.01); *H04N 21/4424* (2013.01); *H04N 21/4436* (2013.01)

(58) Field of Classification Search
  CPC ................ H04N 5/63; H04N 21/4424; H04N 21/43615; G06F 1/32
  USPC .................................................. 713/100, 320
  See application file for complete search history.

(56) References Cited

U.S. PATENT DOCUMENTS

| | | | |
|---|---|---|---|
| 2004/0254683 A1* | 12/2004 | Kim | 700/286 |
| 2009/0059933 A1* | 3/2009 | Huang et al. | 370/401 |
| 2009/0059948 A1* | 3/2009 | Stueve | 370/445 |
| 2010/0031297 A1* | 2/2010 | Klein et al. | 725/78 |
| 2011/0113264 A1* | 5/2011 | Kim | 713/300 |
| 2011/0197085 A1* | 8/2011 | Wu | 713/323 |
| 2011/0197243 A1* | 8/2011 | Kuo et al. | 725/110 |
| 2012/0266003 A1* | 10/2012 | Hutchinson et al. | 713/320 |
| 2014/0181548 A1* | 6/2014 | Lamb et al. | 713/320 |
| 2014/0269470 A1* | 9/2014 | Hybertson et al. | 370/311 |
| 2015/0012648 A1* | 1/2015 | Testin | 709/224 |

OTHER PUBLICATIONS

Jinsoo Han et al. "Service-oriented power management for an integrated multi-function home server" IEEE Transactions on Csonsumer Electronics, vol. 53, No. 1 Feb. 2007.*
Multimedia Over Coax Alliance (2012) "MoCA 1.1 Specification for Device RF Characteristics" V1.0-20120815 (13 pages).

* cited by examiner

Primary Examiner — Vincent Tran
(74) Attorney, Agent, or Firm — Seed IP Law Group PLLC (57) ABSTRACT

Embodiments of the present disclosure are directed to MOCA networks including power-saving MOCA-capable devices. Each of the MOCA-capable devices is operable during a normal or active mode to perform the specific multimedia functionality for which the device is designed, such as to function as a digital video recorder (DVR) and content server, set-top box, and so on. Moreover, each of the MOCA-capable devices is also operable to automatically enter a low-power or standby mode, which reduces the power consumption of the device, when the device need not operate in the active mode. In this way, power savings in each of the MOCA devices results in overall power savings in the MOCA network. A global user-configurable low-power or standby mode parameter can be utilized to override the automatic standby mode operation if desired.

15 Claims, 8 Drawing Sheets

Fig. 8

ENERGY SAVING CIRCUITS AND METHODS FOR MULTIMEDIA OVER COAXIAL ALLIANCE (MOCA) CAPABLE DEVICES

TECHNICAL FIELD

The present disclosure relates generally to power savings in electronic systems, and more specifically to power savings in multimedia over coaxial alliance (MOCA) capable devices and systems containing such devices.

BACKGROUND

The Multimedia over Coaxial Alliance ("MoCA" or "MOCA" herein) is a networking standard for home entertainment networks that utilizes a home's existing coaxial structure or "backbone." In a MOCA network, MOCA-compliant or -capable devices communicate with one another over the coaxial backbone to thereby provide desired content, such as high-definition (HD) video and audio, to occupants of the home. For example, a MOCA network may include a MOCA-capable media center PC that serves multimedia content over the coaxial backbone to other MOCA-capable devices, such as laptop computers and HD televisions (HDTVs). As opposed to serving of such content over a typical in-home wireless network, such as conventional Wi-Fi network, the serving of content over the coaxial backbone allows for a much higher bandwidth and more reliable communication of such content. While the MOCA standard is specifically directed to utilization in homes having existing coaxial backbones, it may of course be used in structures other than homes and in homes or other structures not having an existing coaxial backbones but which have such a backbone newly installed to accommodate the network.

MOCA-capable devices can consume relatively large amounts of power during operation. This is true simply because the MOCA-capable devices are connected to the MOCA network, and even when such content is not desired and is not being used by the occupants of the home. Even if the power consumption of several MOCA-capable devices in a given home is not that large, as more homes implement MOCA networks then the power consumption of such networks in the aggregate could indeed be large, and the wasted power of such devices operating when the operation of the devices is not necessary could be significant.

There is accordingly a need for lowering the power consumption of MOCA-capable devices to thereby lower the power consumption of the MOCA network.

SUMMARY

Embodiments of the present disclosure are directed to MOCA networks including power-saving MOCA-capable devices. Each of the MOCA-capable devices is operable during a normal or active mode to perform the specific multimedia functionality for which the device is designed, such as to function as a digital video recorder (DVR) and content server, set-top box (server and client), MoCA-Ethernet adapter and so on. Moreover, each of the MOCA-capable devices is also operable to automatically enter a low-power or standby mode, which reduces the power consumption of the device, when the device need not operate in the active mode. In this way, power savings in each of the MOCA devices results in overall power savings in the MOCA network. A global user-configurable low-power or standby mode parameter can be utilized to override the automatic standby mode operation if desired.

DETAILED DESCRIPTION

Figure 1:
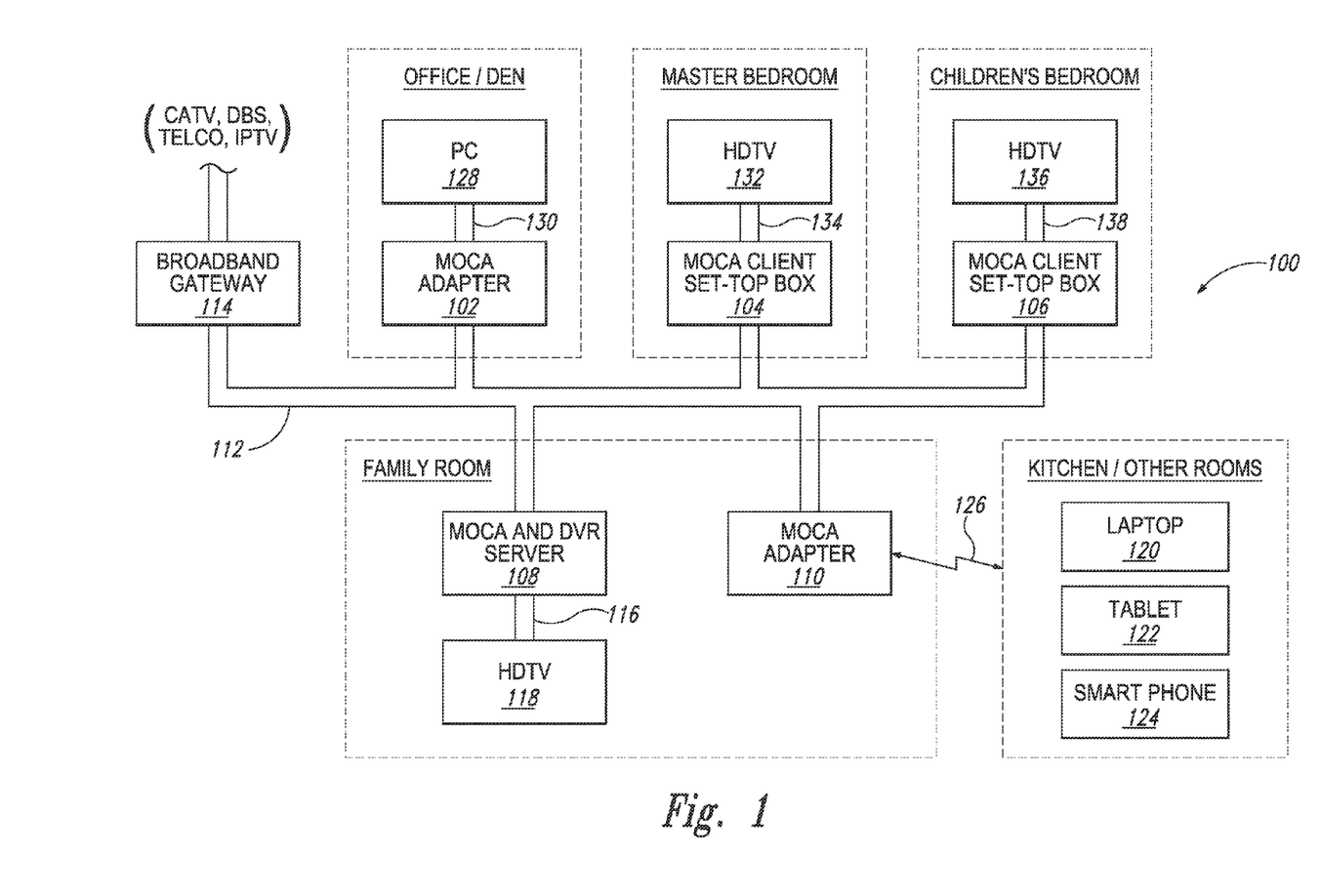
FIG. 1 is a functional block diagram of a MOCA network including power-saving MOCA-capable devices according to one embodiment of the present disclosure.

FIG. 1 is a functional block diagram of a MOCA network 100 including power-saving MOCA-capable devices 102-110 according to one embodiment of the present disclosure. Each of the MOCA-capable devices 102-110 is operable during a normal or active mode to perform the specific multimedia functionality for which the device is designed, such as to function as a digital video recorder (DVR), content server, set-top box (server and client), and MoCA adapters. Moreover, each of the MOCA-capable devices 102-110 is also operable to automatically enter a low-power or standby mode, which reduces the power consumption of the device, when the device need not operate in the active mode, as will be described in more detail below. In this way, power savings in each of the MOCA devices 102-110 results in overall power savings in the MOCA network 100.

In the following description, certain details are set forth in conjunction with the described embodiments of the present disclosure to provide a sufficient understanding of the disclosure. One skilled in the art will appreciate, however, that other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

In the MOCA network 100, the various MOCA-capable devices 102-110 are shown by way of example as being contained within the different rooms in a typical house, and are interconnected through the coaxial backbone 112 contained in the house. A broadband gateway 114 is connected between the coaxial backbone 112 and an external network providing content to the MOCA network 100, where this external network may be a cable television (CATV) network, a direct broadcast satellite (DBS) network, a telephone company network (TELCO), and Internet protocol television (IPTV) network, or any other type of network providing multimedia content to the home or other type of building containing the MOCA network. The specific nature and functionality of the broadband gateway 114 will depend on the type of external network to which it is connected. The broadband gateway 114 could be, for example, a MOCA-capable cable modem that is operable to communicate between the external network (e.g., CATV, DBS, TELCO, IPTV) and the coaxial backbone 112.

The communications over the coaxial backbone 112 and all MOCA-capable devices 102-110 and 114 connected to the backbone occur according to the MOCA communications protocol that manages the communication of devices on a shared coaxial cable network or bus, namely the coaxial backbone. The MOCA communications protocol is a time-sliced point-to-point communications protocol that allows the MOCA-capable devices 102-110 and 114 to communicate with each other over the coaxial backbone 112. The details of the MOCA communications protocol will be understood by those skilled in the art and will not be described in more detail herein to avoid unnecessarily obscuring salient aspects of the present disclosure.

In the example of FIG. 1, the MOCA and DVR server 108 is contained in the Family Room of the house and is coupled to the coaxial backbone 112 and through a suitable multimedia port 116 to an HDTV 118. The port 116 could be a high-definition multimedia interface (HDMI), S-Video, component, or composite video port, for example. The MOCA and DVR server 108 operates to receive and store video and audio content via the external network and the broadband gateway 114 and to thereafter "serve" or provide this content to the HDTV 114 and to other MOCA-capable devices 102-106 and 110 in the MOCA network 100. The MOCA and DVR server 108 also provides other conventional functionality, such as allowing a person watching the HDTV 118 to select desired content to be recorded and viewed. Also contained in the Family Room is the MOCA Adapter 110, which in the example of FIG. 1 is a wireless Adapter that is operable to communicate between the MOCA network and a Wi-Fi network in the home. By way of example, a laptop computer 120, tablet computer 122, and smart phone 124 are shown contained in the kitchen and/or other rooms of the house and communicate over wireless links 126 (i.e., wirelessly via Wi-Fi) with the MOCA network 100. In this way the MOCA Adapter 110 allows the devices 120-124 to connect to the MOCA network 100 wirelessly and, for example, access the Internet or receive multimedia content from a MOCA-capable device in the network such as the MOCA and DVR server 108 in the Family Room.

The MOCA network 100 includes the MOCA Adapter 102 located in the Office or Den of the house in the example of FIG. 1. The MOCA Adapter 102 is not a wireless Adapter as just described above for the Adapter 110, but instead is coupled to a personal computer 128 via an Ethernet port 130. As for the Adapter 110, the Adapter 102 functions to allow the personal computer 128 to communicate with the external network via the MOCA network 100 or to receive content from other MOCA-capable devices in the MOCA network, such as the MOCA and DVR server 108. In the example of FIG. 1, the MOCA network 100 also includes a MOCA client set-top box 104 in the Master Bedroom of the house. The MOCA client set-top box 104 is connected to an HDTV 132 through a suitable communications port 134 which could, for example, be an HDMI, S-Video, component, or composite video port as discussed above with reference to the MOCA and DVR server 108. The client set-top box 104 functions to receive content over the coaxial backbone 112 from the MOCA and DVR server 108 and to process this received content for communication through the port 134 and display on the HDTV 132. The client set-top box 104 includes other conventional set-top box functionality, such as functionality that allows a person watching the HDTV 132 to select desired content stored on the MOCA and DVR server 108 for viewing. Finally, the MOCA network 100 is shown as including another MOCA client set-top box 106 in the Children's Bedroom. This client set-top box 106 is coupled to an HDTV 136 through a port 138 and operates in the same way just described for client set-top box 104 in the Master Bedroom.

Figure 2:
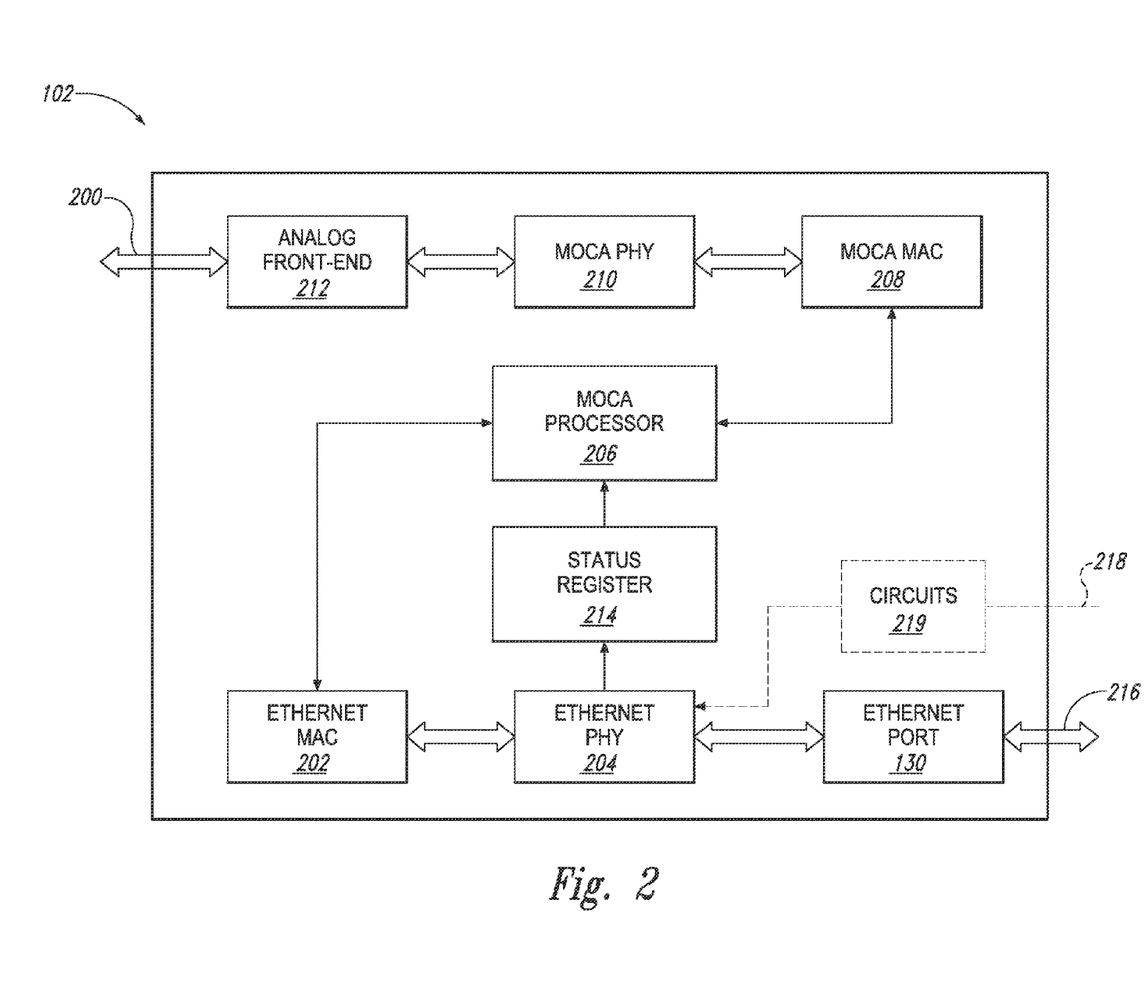
FIG. 2 is a more detailed functional block diagram of one of the MOCA Adaptors of FIG. 1 according to one embodiment of the present disclosure.

When operating as described above, each of the MOCA-capable devices 102-110 is operating in the normal or active mode, meaning the device is operating normally to provide the desired functionality of the device. In addition, each of the MOCA-capable devices 102-110 also operates to automatically enter a low-power or standby mode when the device need not operate in the active mode, as will now be described in more detail with reference to FIG. 2. Note that any of the components of FIG. 1 may referred to in the following description simply as a device or a MOCA-capable. FIG. 2 is a more detailed functional block diagram of the MOCA Adapter 102 of FIG. 1 according to one embodiment of the present disclosure. As seen in FIG. 2, the Adapter 102 includes the Ethernet port 130 that is coupled to the personal computer 128 and also includes a MOCA port 200 through which the Adapter is coupled to the coaxial backbone 112 in the MOCA network 100 of FIG. 1.

The Adapter 102 includes a conventional Ethernet media access control (MAC) layer component 202 and a conventional Ethernet physical (PHY) layer component 204 through which a MOCA processor 206 communicates with the personal computer 128 (FIG. 1) via the Ethernet port 130. The structure and functionality of the Ethernet MAC layer component 202 and Ethernet PHY layer component 204 will be understood by those skilled in the art and are not described in detail herein in order to avoid unnecessarily obscuring the present disclosure. Briefly, the Ethernet PHY layer component 204 provides components for transmitting and receiving signals over the port 130 and include such functionality as signaling levels, signal drivers, analog-to-digital and digital-to-analog conversion, modulation, and so on, while the MAC layer component 202 provides addressing and access control mechanisms to control the communication of data over the Ethernet port 130. The Ethernet MAC layer component 202 and Ethernet PHY layer component 204 may be referred to collectively as Ethernet-interface components.

The MOCA Adapter 102 further includes a MOCA MAC layer component 208 and MOCA PHY layer component 210 that provide analogous functionality as the Ethernet MAC layer component 202 and Ethernet PHY layer component 204, respectively, for communication over the coaxial backbone 112 (FIG. 1) according to the MOCA communications protocol. The MOCA Adapter 102 also includes analog front-end circuitry 212 coupled to the MOCA PHY layer 210 and MOCA port 200. The analog front-end circuitry 212 performs all functions required for receiving signals from the coaxial backbone 112 (FIG. 1) via the MOCA port 200 and converting these signals to levels formats that are suitable for MOCA PHY layer component 210. The analog front-end circuitry 212 also performs all functions required for receiving signals from the MOCA PHY layer component 210 and for transmitting these signals over the coaxial backbone 112 (FIG. 1) via the MOCA port 200. One skilled in the art will understand suitable circuitry for forming the components 208-212 and the functionality of such components in view of the MOCA communications protocol. As a result, the structure and operation of the components 208-212 will not be described in detail herein in order to avoid unnecessarily obscuring the present disclosure. The MOCA MAC layer component 208, MOCA PHY layer component 210, and analog front-end circuitry 212 may be referred to collectively as MOCA-interface components.

The Adapter 102 also includes a status register 214 that stores an operational status state of the Ethernet PHY layer component 204. The status register 214 is shown separately from the Ethernet PHY layer component 204 in FIG. 2 but this register can be contained or considered part of the Ethernet PHY layer component. The status register 214 stores a first value or first state corresponding to the active mode of operation when the Adapter 102 is operating normally to perform its desired function. The status register 214 also stores a second value or second state corresponding to the standby mode of operation of the MOCA Adapter 102. The status register 214 stores the second state when either of two conditions is true. First, if no Ethernet cable is plugged into the Ethernet port 130 then the Ethernet PHY layer component 204 detects that this is the case and stores the second state in the status register 214, indicating the Adapter 102 should operate in the standby mode. An Ethernet cable 216 is represented by the arrow in FIG. 2, and when this cable is not plugged into the Ethernet Port 130 the Ethernet PHY layer component 204 detects this fact and stores the second state in the status register 214 indicating the Adapter 102 should be placed in the standby mode of operation.

The second condition that results in the Ethernet PHY layer component 204 storing the second state in the status register 214 is the activation of a standby-mode device 218 contained in the MOCA Adapter 102. The standby-mode device 218 may be a pushbutton or other type of switch, or may be any other suitable element contained on the Adapter 102 that allows a user to manually place the Adapter into the standby mode of operation. As seen in FIG. 2, the standby-mode device 218 is coupled to circuitry 219 that detects activation of the standby-mode device and provides a suitable signal to the Ethernet PHY layer component 204 indicating this activation. Thus, when the standby-mode device 218 is activated the Ethernet PHY layer detects this activation through the circuitry 219 and stores the second state in the status register 214. The circuitry 219 can be stand-alone circuitry as indicated in FIG. 2 or may be formed as part of the Ethernet PHY layer component, and for this reason the standby-mode device 218 and circuitry 219 are illustrated through a dotted lines in FIG. 2. The Ethernet PHY layer component 204 could thereafter be activated or returned to the active mode through a Wake on LAN (WoL) packet received through the Ethernet port 130 as is discussed in more detail below with reference to other embodiments of the present disclosure.

The MOCA processor 206 runs or executes MOCA firmware to control the overall operation of the MOCA Adapter 102. As seen in FIG. 2, the status register 214 is coupled to the MOCA processor 206. In operation, the MOCA processor 206 monitors the state of the status information stored in the status register 214. When the MOCA processor 206 determines that the status register 214 stores the first state indicating the active mode of operation, the processor controls the components 202, 204 and 208-212 of the MOCA Adapter 102 in their normal operating modes to perform the desired functions of the Adapter. In contrast, when the MOCA processor 206 determines that the status register 214 stores the second state, which indicates the standby mode of operation, the processor 206 thereafter places the Ethernet MAC layer component 202, Ethernet PHY layer component 204, MOCA MAC layer component 208, MOCA PHY layer component 210, and analog front-end component 212 of the MOCA Adapter 102 in low-power or standby modes of operation to thereby reduce the power consumption of the Adapter. In addition, the MOCA processor 206 may also place itself in a standby mode of operation to reduce its power consumption. The specific components within the MOCA-capable device that are placed in the low-power or standby mode may vary in different embodiments of the present disclosure, and MOCA-capable device is considered to be in the low-power or standby mode when the MOCA processor 206 places desired one or ones of the components 202-212 in the low-power or standby mode of operation.

In the standby mode of operation, the MOCA processor 206 and Ethernet PHY layer component 204 continue operating to determine when to place the MOCA Adapter 102 back in the normal or active mode of operation. More specifically, the Ethernet PHY layer component 204 continues operating during the standby mode to determine whether an Ethernet cable 216 is plugged into the Ethernet port 130 or a Wake on LAN (WoL) packet is received on Ethernet port 130. The Ethernet PHY layer component 204 also monitors the status of the standby-mode device 218. If either of the standby-mode device 218 or Ethernet port 130 indicate the MOCA Adapter 102 should resume operation in the normal are active mode, the Ethernet PHY layer component 204 changes the state stored in the status register 214 to the first state, which indicates the Adapter should operate in the normal or active mode. The WoL packet may also be received and utilized by the Ethernet MAC layer component 202, as will be described below with reference to FIGS. 7 and 8 where the Ethernet PHY layer component is omitted.

The Ethernet PHY layer component 204 determines the standby-mode device 218 indicates the MOCA Adapter 102 should resume operation in the active mode whenever the Adapter is currently operating in the standby mode and the standby-mode device is activated. Thus, depending upon the current state of operation of the MOCA Adapter Adapter 102 the standby-mode device 218 can either result in the Ethernet PHY layer component 204 storing the first state in the status register 214 (true when the Adapter 102 is operating in the standby mode) or can result in the Ethernet PHY layer component 204 storing the second state in the status register 214 (true when the Adapter 102 is operating in the active mode). Conversely, whenever the Ethernet PHY layer component 204 detects that there is no Ethernet cable 216 plugged in the Ethernet port 130 the Ethernet PHY layer component stores the second state in the status register 214, were the second state indicates the MOCA Adapter 102 should operate in the standby mode of operation.

As mentioned above, the Ethernet PHY layer component 204 may exit the standby mode of operation upon receiving a Wake on LAN (WoL) packet through the Ethernet port 130. A WoL packet is utilized by the Ethernet PHY layer component 204 or Ethernet MAC Layer 702 to exit from the standby mode of operation and enter the active mode, not to enter the standby mode, as will be appreciated by those skilled in the art. The WoL standard and operation thereof in computer networks such as an Ethernet network allows one device on the network to "awaken" or activate another device on the network that may be operating in a sleep or standby mode, as will also be understood by those skilled in the art.

The MOCA processor 206 continues operating in the standby mode to occasionally check the status stored in the status register 214. Whenever the MOCA processor 206 determines that the first state is stored in the status register 214, the processor places the MOCA Adapter 102 in the active mode of operation. Conversely, whenever the MOCA processor 206 determines that the second state is stored in the status register 214, the processor places the MOCA Adapter 102 in the standby mode of operation.

The entire process by which the MOCA processor 206 and Ethernet PHY layer component 204 operate in combination to terminate operation of the MOCA Adapter 102 in the standby mode and begin operation in the active mode will now be described in more detail. Thus, assume the MOCA Adapter 102 is initially operating in the standby mode such that the status register 214 stores the second state. In this situation, whenever the Ethernet PHY layer component 204 determines either the standby-mode device 218 has again been activated or a cable 216 is plugged into the Ethernet port 130, or the Wake on LAN (WoL) packet is received on Ethernet port 130, then the Ethernet PHY layer component changes the state of the status register 214 to store the first state, indicating the normal mode of operation. The MOCA processor 206 will thereafter read the state of the status register 214 and determine that the register now stores the first state, at which point the processor will activate all components 202, 204, 208-212 and activate itself to operate in their normal modes of operation, thereby placing the MOCA Adapter 102 into the normal mode of operation and terminating operation in the standby mode.

In one embodiment, the MOCA processor 206 also operates to keep the MOCA Adapter 102 in the standby mode of operation even when the standby-mode device 218 is again activated if there is no cable 216 in the Ethernet port 130 or no Wake on LAN (WoL) packet is received on Ethernet port 130. As will described in more detail below, in one embodiment the MOCA network 100 of FIG. 1 includes a globally defined low-power or standby mode parameter that is configurable by a user of the network. This user-configurable parameter allows a user to override or disable the automatic standby mode of operation of the MOCA adapter 102 and other MOCA-capable devices in the network 100. There may be no reason for the Adapter 102 to remain fully operational when there is no external component such as a personal computer coupled to the Ethernet port 130 to interface with a fully functional Adapter. In this way, assuming the user-configurable parameter is absent or is not set to override or disable automatic standby functionality, power consumption of the Adapter 102 is reduced by placing the Adapter in standby mode when the functionality of the Adapter is not required.

Figure 3:
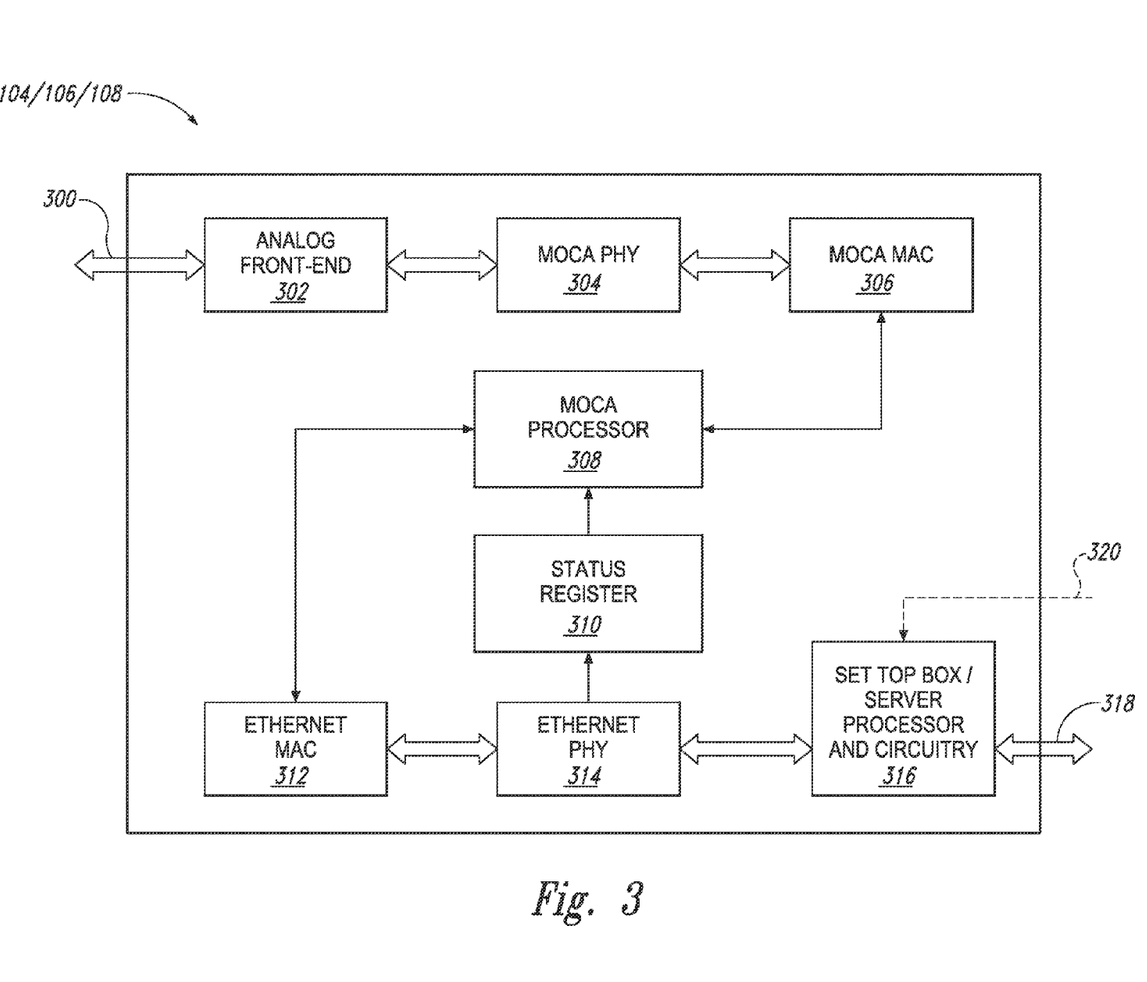
FIG. 3 is a more detailed functional block diagram of one of the set-top boxes of FIG. 1 according to another embodiment of the present disclosure.

FIG. 3 is a more detailed functional block diagram of one of the set-top boxes 104, 106 or the MOCA and DVR server 108 of FIG. 1 according to another embodiment of the present disclosure. The device 104/106/108 of FIG. 3 includes a MOCA port 300, an analog front-end component 302, MOCA PHY component 304, MOCA MAC component 306, MOCA processor 308, status register 310, Ethernet MAC layer component 312, and Ethernet PHY layer component 314, all of which are analogous to the corresponding components previously described with reference to the Adapter 102 of FIG. 2. Accordingly, each of these components will not be described in detail again with reference to FIG. 3. As will be appreciated by those skilled in the art, the specific firmware executed by the MOCA processor 308 in the device 104/106/108 will of course vary slightly depending upon the specific type of device.

The device 104/106/108 further includes set-top box/server processor and circuitry 316 that is operable to perform the desired functions of the device and which interfaces with the Ethernet PHY layer component 314. For example, where the device is one of the set-top boxes 104, 106, the processor and circuitry 316 includes suitable circuitry, which may include digital and analog circuitry as well as software or firmware executing on the circuitry, to control the overall operation of and perform desired functions of the device. A multimedia port 318 corresponds to the ports 134, 138, 116 in FIG. 1 and the processor provides multimedia content and control information through this port to the particular HDTV 132, 136, 108 or other device coupled to the device 104/106/108. The multimedia port 318 may be any type of port that is suitable for connecting to the device that will be displaying or otherwise using the content being provided, and thus may be an HDMI port, Ethernet port, and so on. The processor and circuitry 316 represents existing circuitry contained in the specific device 104/106/108 and interfaces with the Ethernet PHY layer component 314. In this way, the components 300-314 can simply be coupled to existing device circuitry, namely the processor and circuitry 316, in order to form the MOCA-capable device 104/106. So an existing set-top box would include the processor and circuitry 316 and then the components 300-314 are simply coupled to this circuitry to form the MOCA-capable device 104/106/108, as will be described in more detail below with reference to FIG. 4.

The device 104/106/108 includes a standby-mode device 320 coupled to the set-top box/server processor and circuitry 316 In operation, when the standby-mode device 320 is activated the processor and circuitry 316 detects this activation and deactivates or disables Ethernet MAC layer circuitry (not shown) contained in the processor and circuitry 316. The Ethernet MAC layer circuitry in the processor and circuitry 316 is the circuitry that communicates with the Ethernet PHY layer component 314. During active or normal operation of the device 104/106/108 the status register 310 stores the first state. In response to the standby-mode device 320 being activated, the Ethernet MAC layer circuitry in the processor and circuitry 316 shuts down. The Ethernet PHY layer component 314 detects that the Ethernet MAC layer circuitry in the processor and circuitry 316 has shut down, which is analogous to the Ethernet cable 216 being unplugged in FIG. 2, and then changes the state stored in the status register 310 the second state, indicating the standby mode of operation. The MOCA processor 308 monitors the status register 310 and upon detecting that the register stores the second state, the MOCA processor places itself along with the other components in the device 104/106/108 in the standby mode of operation, reducing the power consumption of the device. In this embodiment the Ethernet PHY layer component 314 can be viewed as and provides the functionality of dual Ethernet PHY layer components, one Ethernet PHY layer component being coupled to the Ethernet MAC circuitry in the processor and circuitry 316 and the other being coupled to the Ethernet MAC layer component 314, with the two Ethernet PHY layer components also being interconnected. When viewed this way, the Ethernet PHY layer component that is coupled to the Ethernet MAC circuitry in the processor and circuitry 316 is operable to update the state of the status register 310.

Where the multimedia port 318 of FIG. 3 is an HDMI port in the set-top box devices 104 and 106, the HDMI port has the functionality to detect whether an HDTV 132, 136 is connected to the HDMI port, as will be appreciated by those skilled in the art. Accordingly, if an HDTV 132, 136 is not connected to the HDMI ports 134, 138 of the set-top box devices 104, 106, then the MOCA processor 308 can detect this fact and place the desired components 302-316 in the standby mode of operation. The specific manner in which this is done may vary. For example, upon detecting an HDTV 132, 136 is not connected to the HDMI ports 134, 138, circuitry for the HDMI port 318 in the processor and circuitry 316 may provide a signal indicating this fact directly to the MOCA processor 308, or may change the value of the status information stored in the status register 310. Similarly, when the circuitry for the HDMI port 318 in the processor and circuitry 316 detects an HDTV or other device has been connected to the HDMI port, this fact can be detected such that the MOCA processor 308 removes the device 104, 106 from the standby mode of operation. Once again, the specific manner in which this is accomplished may vary in different embodiments. In these embodiments utilizing the functional of the HDMI port 318, the automatic entry into the standby mode may once again be overridden or disabled through the user-configurable parameter discussed above.

Disabling this automatic standby mode operation may be used, for example, when the multimedia port 318 of the set-top box 104, 106 includes not only an HDMI port but also other types of video ports, such component video, composite video, S-video, and stereo audio ports. In this situation, one of the other ports may be utilized instead of the HDMI port but in this case just because no HDTV is coupled to the HDMI port it is not desired to place the set-top box device 104, 106 in the standby mode. Typically these other types of ports (e.g., component video, composite video, S-video, and stereo audio ports) do not provide the functionality to detect whether a corresponding device is attached to port. Suitable circuitry could be added to the device 104, 106 to provide such functionality.

In addition to the MOCA processor 308 detecting whether and HDTV 132, 136 or other device is connected to the HDMI port 318, the MOCA processor in other embodiments also detects whether other status conditions exist before placing the device 104/106/108 into the standby mode of operation.

In the embodiments of FIGS. 2 and 3, specific types of MOCA-capable devices are described, namely the MOCA Adapter 102 in FIG. 2 and the set-top boxes 104, 106 and MOCA and DVR server 108 in FIG. 3. These devices are used simply by way of example and the concepts described with reference to these embodiments can be applied to any type of MOCA-capable device. Whenever the specific type of MOCA-capable device is not available for normal operation in the MOCA network 100 the particular device can switch into the standby mode of operation based on the principles described with reference to FIGS. 2 and 3. For example, the same concepts apply to the wireless MOCA Adapter 110. Where no wireless devices, such as a laptop computer 120, tablet computer 122, and smart phone 124, are coupled through the wireless link 126 to the Adapter 110, then the Adapter could enter the standby mode of operation.

In another embodiment, the MOCA network 100 of FIG. 1 includes a globally defined low-power or standby mode parameter that is configurable by a user of the network. This user-configurable parameter allows a user to override the automatic standby mode of operation as described above with reference to FIGS. 1 and 2. Configuration of the user-configurable parameter through a suitable user interface on one of the MOCA-capable devices, such as the MOCA and DVR server 108. The user interface would typically allow a user to display configuration information for the MOCA network 100 on the video display device connected to the MOCA and DVR server, which is the HDTV 118 FIG. 1. Using a remote control or in another a suitable manner a user can access configuration settings for the network 100 including the user-configurable parameter. The state of the user-configurable parameter could then be communicated by the MOCA and DVR server 108 over the coaxial backbone 112 to the other MOCA-capable devices 102, 104, 110 to set the user-configurable globally defined standby mode parameter in these devices as well. In other situations, however, each MOCA-capable device may include its own independently settable user-configurable parameter. For example, the MOCA and DVR server 108 can have a user-configurable parameter that is set independent of the setting of the client set-top boxes 104, 106. In fact, typically the MOCA and DVR server 108 would have its user-configurable setting set to override automatic standby mode since, for example, the server could be recording streaming content while not streaming this content to the client set-top boxes 104, 106 such that these client set-top boxes can be in standby mode while the sever is not and is recording the Multimedia content.

In this embodiment, if a user wants the MOCA-capable devices 102-110 to enter the standby mode of operation as described above with reference to FIGS. 2 and 3 then the user "enables" or sets the user-configurable parameter to a first value. In contrast, the user can override or stop this operation by "disabling" the user-configurable globally defined standby mode parameter, where disabling means setting the parameter to a second value that is different than the first value. In this situation, the MOCA-capable devices 102-110 will operate as follows. The MOCA Adapter 102 of FIG. 2 will remain in the active or normal mode of operation regardless of whether an Ethernet cable 216 is plugged into the Ethernet port 130. Moreover, the set-top boxes 104/106 or MOCA and DVR server 108 of FIG. 3 will operate as follows in this situation. When the user-configurable globally defined standby mode parameter is disabled and a user pushes the standby-mode device 320, the device 104/106/108 puts all components of the set-top box in standby mode except for the MOCA interface components, namely the MOCA MAC layer component 306, the MOCA PHY layer component 304, and the analog front-end component 302. Some set-top boxes 104,106 require these MOCA interface components 302,304, 306 to be active even in the standby mode. For example, if the MOCA and DVR server 108 is performing a software update to MOCA client set-top box 104,106 then the MOCA network 100 needs to be active so that the software update is not disrupted due to automatic standby operation. Also, apart from software updates, a server on the network 100, such as MOCA and DVR server 108 may want to transfer Electronic Program Guide (EPG) information to the MOCA client set-top boxes 104, 106 and may not wish to disrupt such a transfer due to one of the devices entering an automatic standby mode of operation. There are of course many scenarios in which MOCA interface components 302,304,306 may remain active even in the standby mode and is dependent on the particular usage case as someone skilled in the art will appreciate.

Figure 4:
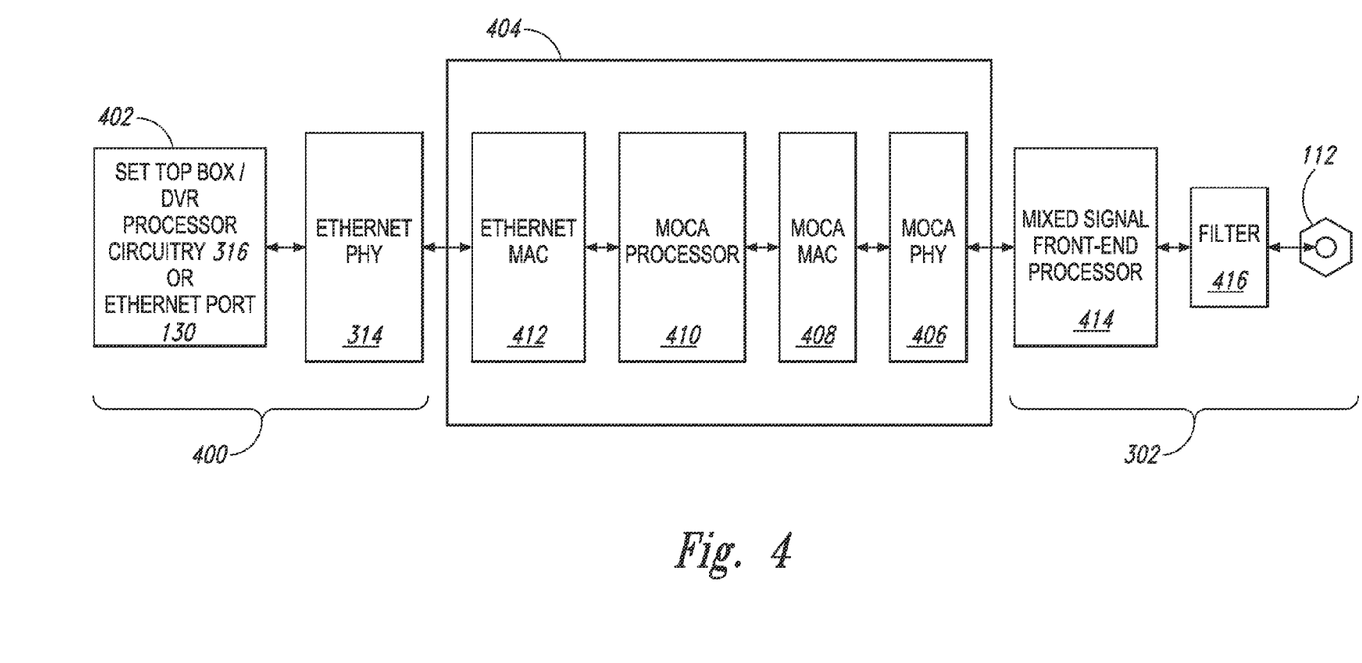
FIG. 4 is a functional block diagram illustrating the MOCA circuitry of FIGS. 2 and 3 according to one embodiment of the present disclosure.

FIG. 4 is a functional block diagram illustrating the MOCA circuitry of FIGS. 2 and 3 according to one embodiment of the present disclosure. FIG. 4 illustrates how the MOCA circuitry described above with reference to FIGS. 2 and 3 can be implemented to allow the circuitry to be easily integrated with existing network devices to make these devices MOCA-capable device. In FIG. 4, components 400 on the left of the figure correspond to circuitry that would be contained in existing network devices. The box 402 on the far left represents the set-top box or DVR circuitry 316 where the device is a set-top box or DVR as discussed with reference to FIG. 3 and represents the Ethernet port 130 where the device is an Ethernet Adapter as discussed with reference to FIG. 2.

In the embodiment of FIG. 4 an integrated circuit or chip 404 includes the illustrated MOCA components 406-410 and Ethernet MAC layer component 412. In this way, the single chip 404 may be utilized by manufacturers of network devices to make existing network devices MOCA-capable devices. In addition to the chip 404, a mixed-signal front end processor 414 is coupled to the MOCA PHY layer component of the chip 404 and is further coupled to a filter 416 that is, in turn, coupled to coaxial port that couples the filter to the coaxial backbone 112 (FIG. 1). The processor 414 and filter 416 correspond to the analog front-end circuitry 212 and 302 of FIGS. 2 and 3, respectively.

Figure 5:
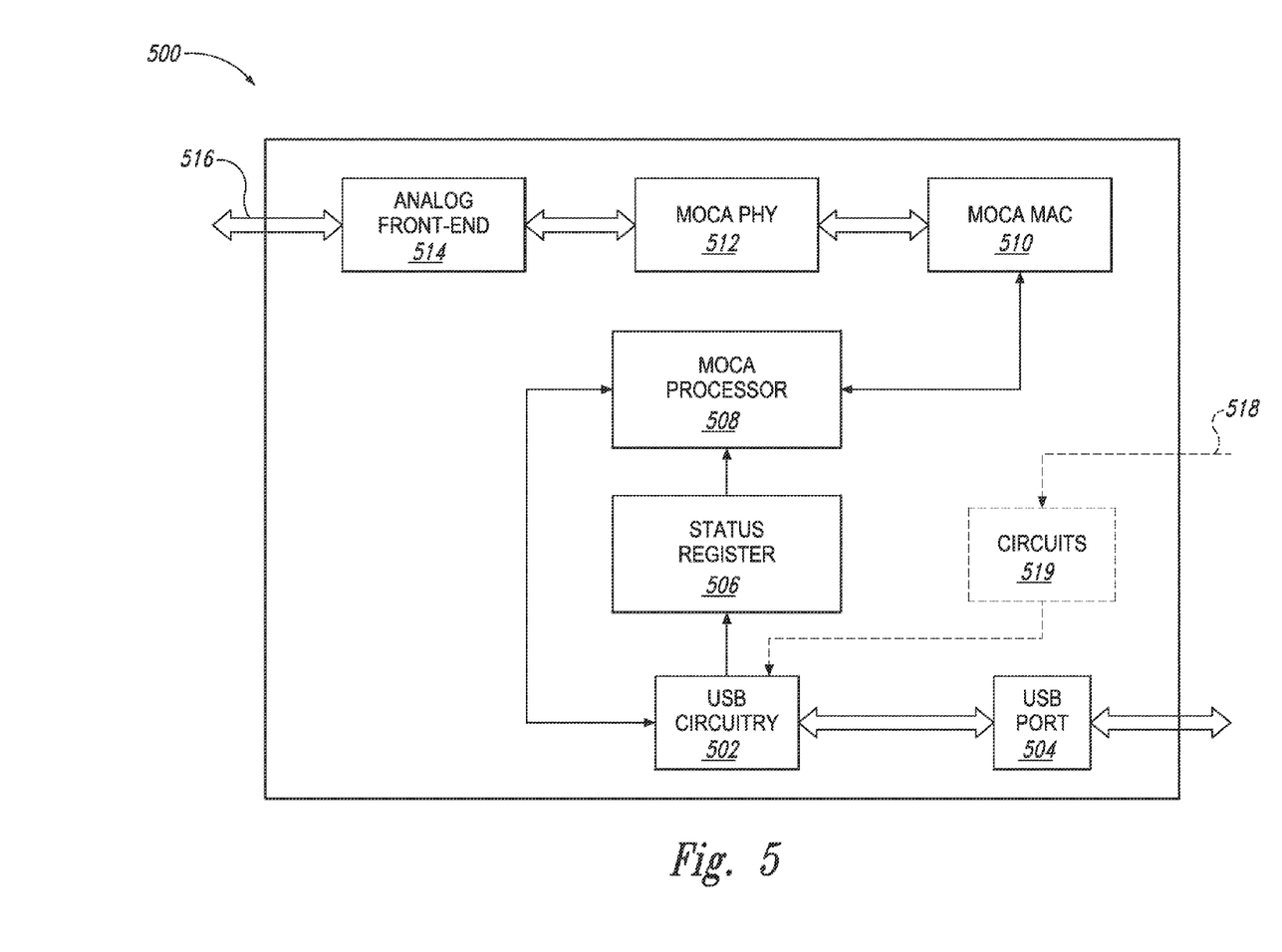
FIG. 5 is a functional block diagram of a MOCA Adaptor including USB circuitry according to another embodiment of the present disclosure.

FIG. 5 is a functional block diagram of a MOCA Adaptor 500 (typically called MOCA_USB Adaptor) including USB circuitry 502 coupled to a USB port 504 according to another embodiment of the present disclosure. The MOCA adapter 500 includes a status register 506, MOCA processor 508, MOCA MAC layer component 510, MOCA PHY layer component 512, and analog front-end circuitry 514 coupled to a MOCA port 500 and interconnected as shown. These components operate in substantially the same way as the corresponding components in the embodiment of FIG. 2 and thus will not again be described in detail. In the embodiment of FIG. 5 the Adapter 500 functions as a bridge or adapter between the MOCA network 100 and MOCA coaxial backbone 112 (FIG. 1) and a device (not shown in FIG. 5) coupled to the USB port 504. In one embodiment, the USB circuitry 502 detects whether a device is plugged into the USB port 504, and stores the appropriate first or second value in the status register to place the Adapter 500 in the normal or standby mode of operation in response thereto. More specifically, when a USB cable is plugged into the USB port 504 the USB circuitry 502 stores the first value in the status register 506 and when no USB cable is plugged into the USB port 504 the USB circuitry 502 stores the second value in the status register 506. The Adapter 500 could also include a standby-mode device 518, which is coupled through circuitry 519 to the USB circuitry 502. The circuitry 519 could also be formed as part of the USB circuitry 502. In operation, the circuitry 519 detects activation of the standby-mode device 518 and provides a suitable signal to the Ethernet PHY layer component 204 indicating this activation. In response to this signal from the circuitry 519, the USB circuitry 502 changes the state of the status register 506 to the second state to thereby place the Adapter 500 in the standby mode of operation. The MOCA processor 508 monitors the state of the status register 506 and controls operation of the Adapter 500 in the normal and standby modes responsive to the value stored in this register as previously discussed with reference to FIGS. 2 and 3. The signal from the circuitry 519 responsive to the standby-mode device being activated is analogous to the USB circuitry 502 detecting that no USB cable is plugged into the USB port 504.

Figure 6:
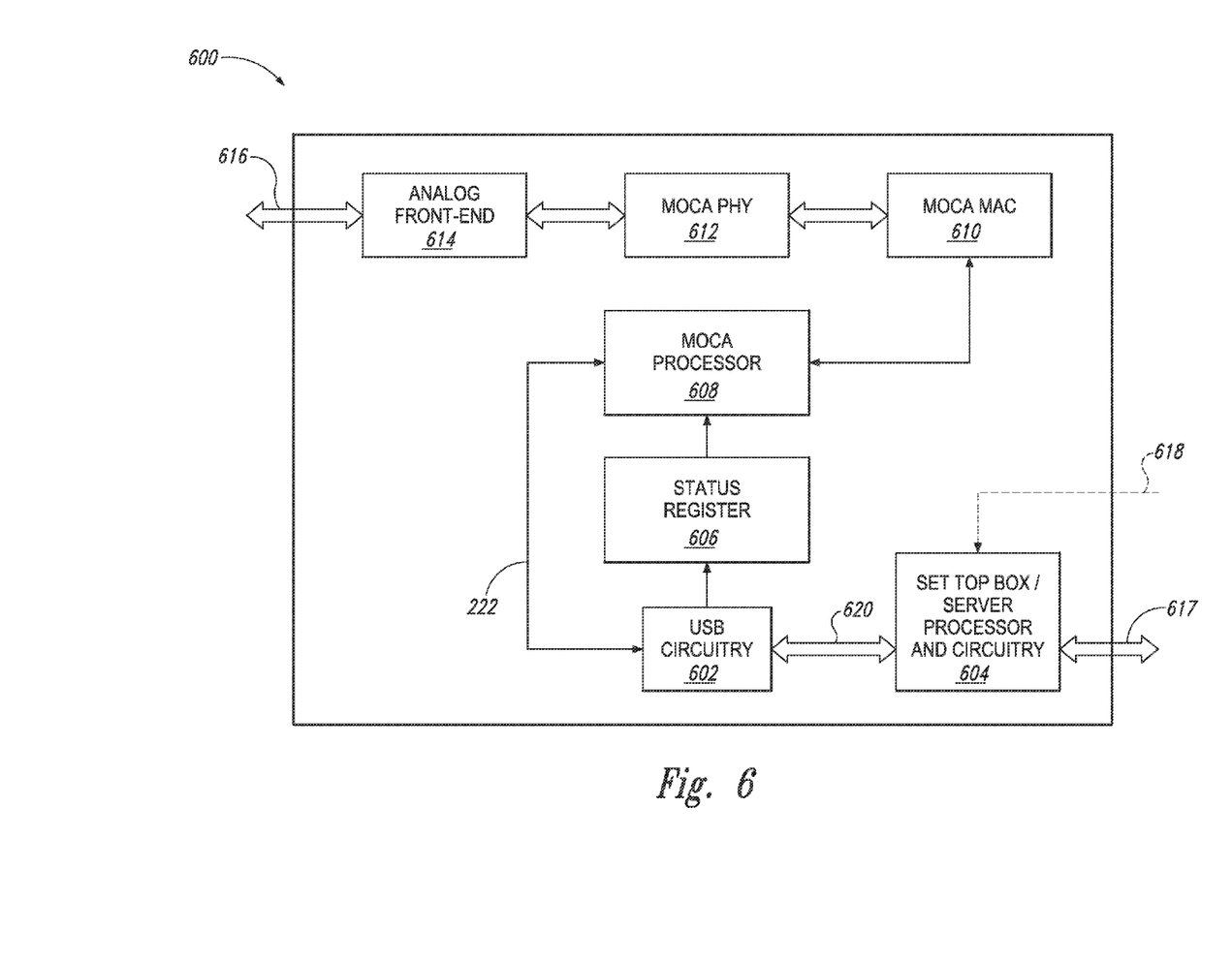
FIG. 6 is a functional block diagram of a MOCA set-top box including USB circuitry according to yet another embodiment of the present disclosure.

FIG. 6 is a functional block diagram of a MOCA set-top box 600 including USB circuitry 602 coupled to set-top box/server processor and circuitry 604 according to yet another embodiment of the present disclosure. The MOCA set-top box 600 includes a status register 606, MOCA processor 608, MOCA MAC layer component 610, MOCA PHY layer component 612, and analog front-end circuitry 614 coupled to a MOCA port 600 and interconnected as shown. These components operate in substantially the same way as the corresponding components in the embodiment of FIG. 3 and thus will not again be described in detail.

In the embodiment of FIG. 6 the set-top box 600 functions in the MOCA network 100 and is coupled to MOCA coaxial backbone 112 (FIG. 1) through MOCA port 616 and is coupled to a device (not shown in FIG. 5) through a multimedia port 617. A standby-mode device 618 is shown coupled to the set-top box/server processor and circuitry 604. The device 600 operates in the normal and standby modes responsive to the standby-mode device 618 similar to the operation previously discussed with reference to FIG. 3. More specifically, the processor and circuitry 604 detects activation of the standby-mode device 618 and in response to detecting such activation shuts down or disable USB circuitry (not shown) contained in the processor and circuitry 604 that communicates with the USB circuitry 602. In response to the USB circuitry in the processor and circuitry 604 being disabled, which is analogous to the USB cable being removed from the USB port 504 in FIG. 5, the USB circuitry 602 detects this disabling and changes the value stored in the status register 606 to the second value, indicating the standby mode of operation. Where the multimedia port 617 is an HDMI port the processor and circuitry 604 could include circuitry for detecting the presence or absence of an HDMI device such an HDTV coupled to the port and when no such device is connected the MOCA processor 608 could directly or via the status register 606 detect this fact and then place the set-top box in the standby mode of operation, subject to user-configurable parameter in some embodiments.

In one embodiment of the device 600 of FIG. 6, the USB circuitry 602 may itself be a USB-Ethernet adapter. In this embodiment, the USB circuitry 602 communicates over a USB bus 620 with the set top box/server processor and circuitry 604 and communicates with the MOCA processor 608 via Ethernet over the link 622. The standby-mode device 618 can either be coupled to the set-top box/server processor and circuitry 604 or to the USB circuitry 602 (not shown in FIG. 6) in this embodiment.

Figure 7:
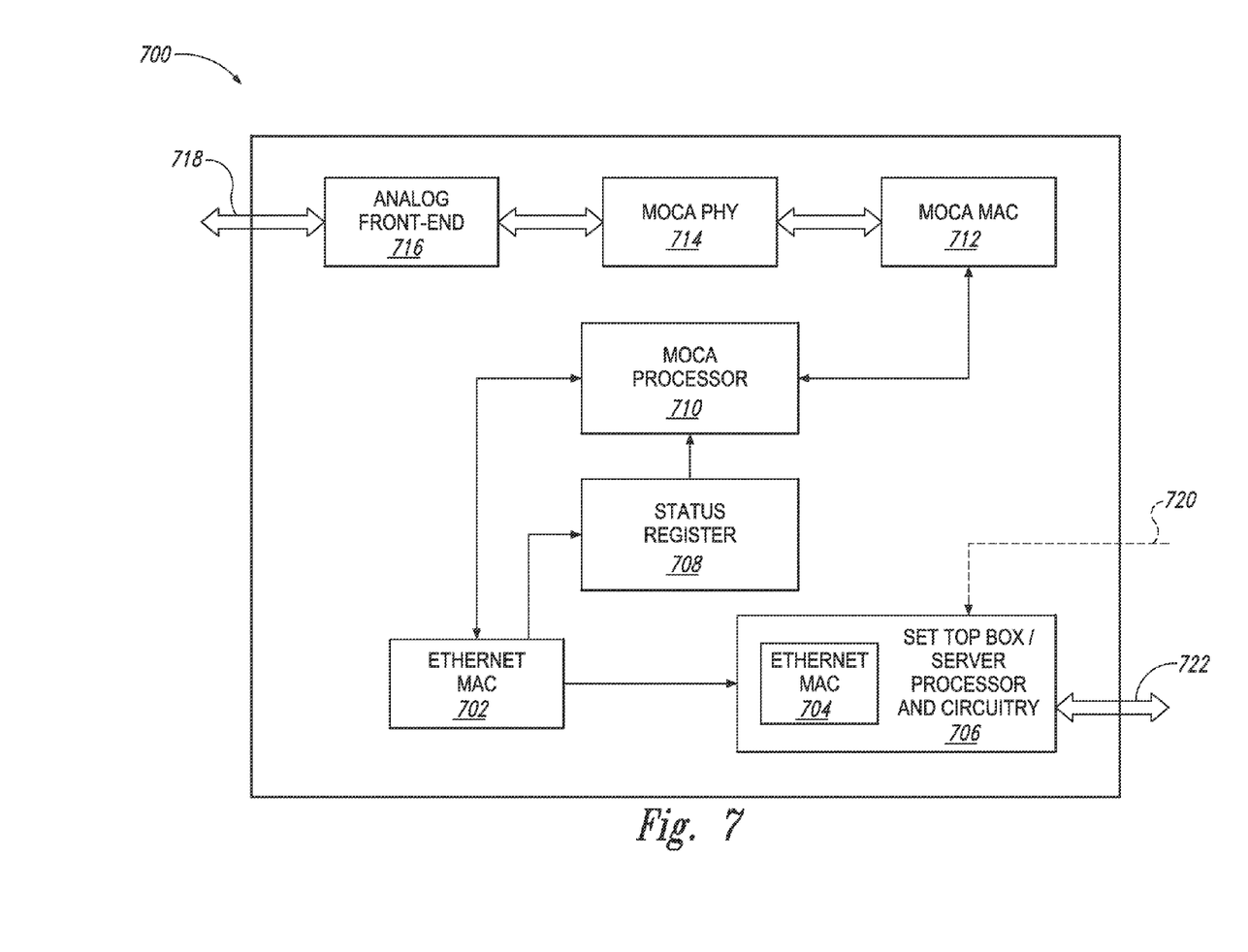
FIG. 7 is a functional block diagram of a MOCA set-top box according to a still further embodiment of the present disclosure.

FIG. 7 is a functional block diagram of a MOCA set-top box 700 according to a still further embodiment of the present disclosure. The set-top box 700 is the same as the device 104/106/108 discussed with reference to FIG. 3 except the no Ethernet PHY layer component is included. In this embodiment an Ethernet MAC layer component 702 is coupled to an Ethernet MAC layer component 704 contained in set-top box/server processor and circuitry 706. The set-top box 700 further includes a status register 708, MOCA processor 710, MOCA MAC layer component 712, MOCA PHY layer component, analog front-end circuitry 716, MOCA port 718, and standby mode device 720 interconnected as shown. In this embodiment the standby mode device 720 is coupled to the set-top box/server processor and circuitry 706. The set-top box/server processor and circuitry 706 detects activation of the standby-mode device 720, and in response thereto the processor and circuitry deactivates or disables the Ethernet MAC layer component 704. At this point, the Ethernet MAC layer component 702 detects that the Ethernet MAC layer component 704 has been deactivated, which is analogous to the Ethernet cable 216 being removed in FIG. 2. Upon detecting that the Ethernet MAC layer component 704 has been deactivated, the Ethernet MAC layer component 702 changes the state of the status register 708 to the second value to thereby place the device 700 into the standby mode of operation. The Ethernet MAC layer components 702 and 704 include conventional power management blocks (not shown) that can be used in combination with the standby mode device 720 to control placing the device in the normal or standby mode of operation as just described. Once again, the device 700 can also be placed in the standby mode or not based on whether a device is coupled to multimedia port 722 as discussed for other embodiments above. Also, as mentioned above a WoL packet may be received and utilized by the Ethernet MAC layer component 702 in the embodiment of FIG. 7 to take the device 700 out of the standby mode of operation. Thus, the processor and circuitry 706 could be operating in the standby mode due to no HDMI cable being plugged into the multimedia port 722, at which point the Ethernet MAC layer component 704 is disabled. Upon an HDMI cable being plugged into port 722, the processor and circuitry 722 would detect this situation and activate the Ethernet MAC layer component 704 which, in turn, could provide a WoL packet to the Ethernet MAC layer component 702 to thereby activate this component and cause it to store the first value in the status register 708 to activate the device 700.

Figure 8:
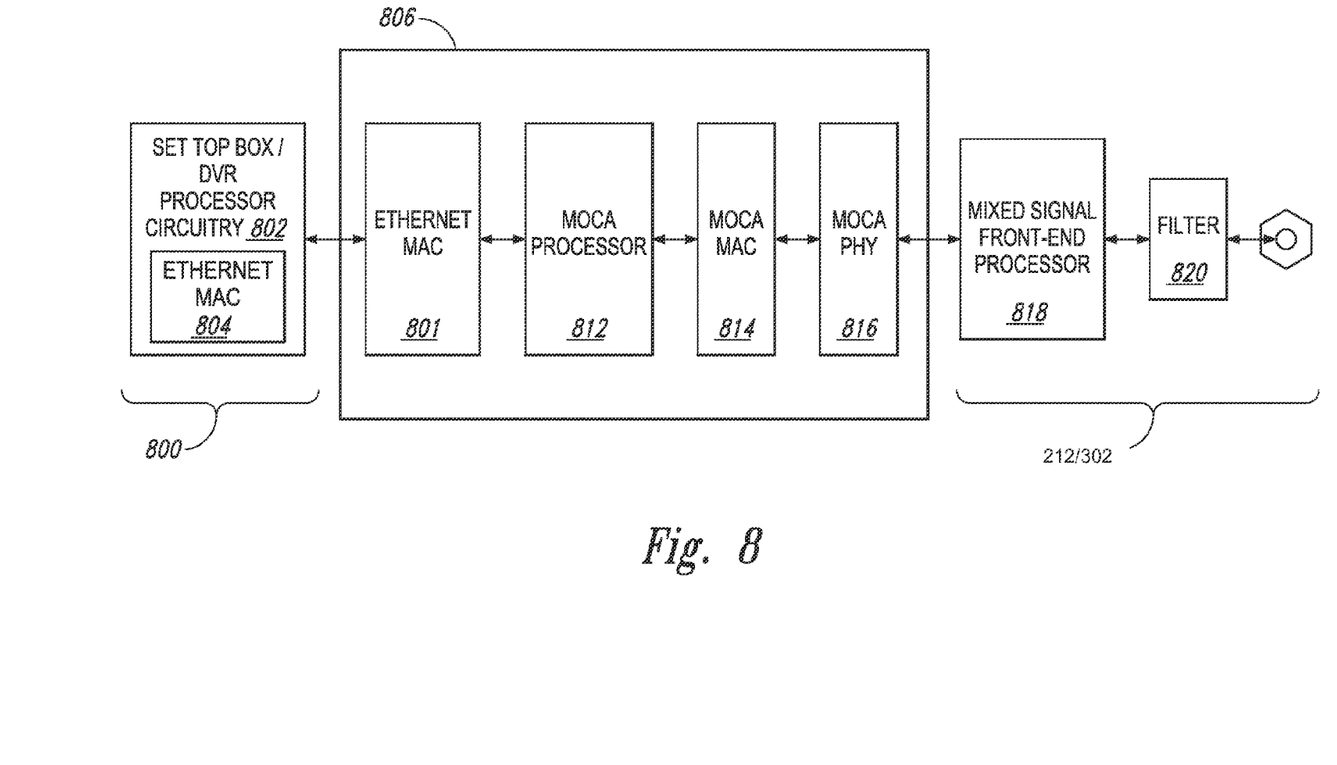
FIG. 8 is a functional block diagram of another embodiment of the integrated circuit or chip of FIG. 4 according to yet another embodiment of the present disclosure.

FIG. 8 is a functional block diagram of another embodiment of the integrated circuit or chip of FIG. 4 according to yet another embodiment of the present disclosure. In FIG. 8, just as for FIG. 4, components 800 on the left of the figure correspond to circuitry that would be contained in existing network devices and includes set-top box processor and circuitry 802 that includes an Ethernet MAC layer component 804. The components 800 thus represent the set-top box circuitry 316 of FIG. 3 where the device is a set-top box or server as discussed with reference to FIG. 3 and represents the Ethernet port 130 where the device is an Ethernet Adapter as discussed with reference to FIG. 2. FIG. 8 illustrates how the MOCA circuitry 800 described above with reference to FIGS. 2-7 can be implemented to allow the circuitry to be easily integrated with existing network devices to make these devices MOCA-capable devices.

In the embodiment of FIG. 8 an integrated circuit or chip 806 includes the illustrated MOCA components 810-816 that function as previously described for corresponding components discussed with reference to FIGS. 1-7. In this way, the single chip 806 may be utilized by manufacturers of network devices to make existing network devices MOCA-capable devices. In addition to the chip 806, a mixed-signal front end processor 818 is coupled to the MOCA PHY layer component 816 of the chip 806 and is further coupled to a filter 820 that is, in turn, coupled to a coaxial port that couples the filter to the coaxial backbone 112 (FIG. 1). The processor 818 and filter 820 correspond to the analog front-end circuitry 212 and 302 of FIGS. 2 and 3, respectively. In the embodiment of FIG. 8, the Ethernet PHY layer component 314 is eliminated as compared to the embodiment of FIG. 4, such that the Ethernet MAC layer component 804 in the set-top box processor and circuitry 802 is coupled directly to the Ethernet MAC layer component 810 in the chip 806. This is also illustrated in the embodiment of FIG. 7.

Even though various embodiments and advantages of the embodiments of the present disclosure have been set forth in the foregoing description, the above disclosure is illustrative only, and changes may be made in detail and yet remain within the broad principles of the present disclosure. Moreover, the functions performed by components described above can be combined to be performed by fewer elements, separated and performed by more elements, or combined into different functional blocks, as will be appreciated by those skilled in the art. For example, MOCA networks according to embodiments of the present disclosure need not include the broadband gateway 114 of FIG. 1, for example. Also, although not expressly shown in the figures, each MOCA processor generates suitable control signals and applies these control signals to the required components contained in the MOCA-capable device to control the individual components as well as to control the overall operation of the MOCA-capable device. In addition, note that although Ethernet ports, USB ports, and HDMI ports have been utilized by way of example in the above embodiments, the concepts of the present disclosure are not limited to such specific types of ports and other types of ports may be utilized in other embodiments of the disclosure, as will be appreciated by those skilled in the art.

What is claimed is:

1. A MOCA-capable device, comprising:
   a MOCA port;
   MOCA-interface circuitry coupled to the MOCA port;
   a status register configured to store status information having a first value to indicate a normal operating mode of the MOCA-capable device and having a second value to indicate a standby mode of the MOCA-capable device;
   Ethernet-interface circuitry coupled to the status register, the Ethernet-interface circuitry including an Ethernet port and configured to detect whether an Ethernet cable is plugged into the Ethernet port and to change the value of the status information in the status register to the second value when no Ethernet cable is plugged into the Ethernet port;
   a MOCA processor coupled to the MOCA-interface circuitry, the Ethernet-interface circuitry, and to the status register, the MOCA processor operable to the detect the value of the status information stored in the status register and to place the Ethernet-interface circuitry into the standby mode responsive to the status information having the second value; and
   standby mode detection circuitry coupled to the Ethernet-interface circuitry, the standby mode detection circuitry including a manual standby mode device, and wherein the Ethernet-interface circuitry is further configured to change the value of the status information to the second value responsive to the standby mode detection circuitry detecting activation of the manual standby mode device.

2. The MOCA-capable device of claim 1, wherein the MOCA-capable device comprises an Ethernet Adapter.

3. The MOCA-capable device of claim 1, wherein the MOCA-capable device comprises a set-top box.

4. The MOCA-capable device of claim 1, wherein the Ethernet-interface circuitry includes the status register.

5. The MOCA-capable device of claim 1, wherein the standby mode device comprises a switch.

6. The MOCA-capable device of claim 1 further comprising:
   set-top box circuitry coupled to the Ethernet-interface circuitry; and
   a multimedia port coupled to the set-top box circuitry.

7. The MOCA-capable device of claim 1, wherein the MOCA-interface circuitry comprises:
   analog front-end circuitry coupled to the MOCA port;
   MOCA PHY layer circuitry coupled to the analog front-end circuitry; and
   MOCA MAC layer circuitry coupled to the MOCA PHY layer circuitry and to the MOCA processor.

8. The MOCA-capable device of claim 1, wherein the Ethernet-interface circuitry comprises:
   Ethernet PHY layer circuitry; and
   Ethernet MAC layer circuitry coupled to the Ethernet PHY layer circuitry and to the MOCA processor.

9. A method of lowering the power consumption of a MOCA-capable device, comprising:
   detecting whether the MOCA-capable device should operate in a normal mode or a standby mode by determining whether an Ethernet cable is plugged into an Ethernet port on the MOCA-capable device and determining whether a manual standby mode device has been activated;

upon detecting the MOCA-capable device should operate in the standby mode, placing components in MOCA-capable device into low power modes of operation to thereby lower the power consumption of the MOCA-capable device relative to the power consumption during the normal mode of operation;

storing a user-configurable standby mode parameter, the user-configurable standby mode parameter having a first value when the standby mode of operation of the MOCA-capable device is to be overridden; and when the user-configurable standby mode parameter has the first value, preventing operation of the MOCA-capable device in the standby mode even when detecting whether the MOCA-capable device should operate in a normal mode or a standby mode indicates the device should operate in the standby mode.

10. The method of claim 9, wherein detecting whether the MOCA-capable device should operate in the normal mode or the standby mode comprises reading the value of information stored in a status register.

11. The method of claim 9, wherein determining whether the manual standby mode device has been activated comprises detecting activation of a switch.

12. A MOCA-capable device, comprising:
network device circuitry including Ethernet MAC layer circuitry and analog front end circuitry; and
an integrated circuit coupled to the network device circuitry, the integrated circuit including:
Ethernet MAC layer circuitry coupled to the Ethernet MAC layer circuitry in the network device circuitry;
MOCA PHY interface circuitry;
a status register configured to store status information having a first value to indicate a normal operating mode of the MOCA-capable device and having a second value to indicate a standby mode of the MOCA-capable device; and
a MOCA processor coupled to the MOCA interface circuitry and to the Ethernet MAC layer circuitry and the status register, the MOCA processor operable to place the Ethernet MAC layer circuitry into a standby mode of operation in response to status register storing the second value.

13. The MOCA-capable device of claim 12, wherein each of the network device circuitry and the integrated circuit further comprise an Ethernet PHY layer circuit, and wherein the Ethernet MAC layer circuitry of the integrated circuit is coupled to the Ethernet MAC layer circuitry in the network device circuitry through these Ethernet PHY layer circuits.

14. The MOCA-capable device of claim 12 further comprising standby mode detection circuitry coupled to the network device circuitry, the standby mode detection circuitry including a standby mode device and the network device circuitry configured to deactivate the Ethernet MAC layer circuitry contained in the network device circuitry responsive to activation of the standby mode device, and wherein the Ethernet MAC layer circuitry in the integrated circuit detects the deactivation of the Ethernet MAC layer circuitry contained in the network device circuitry and changes in response thereto changes the value stored in the status register to the second value.

15. The method of claim 14, wherein the standby mode device comprises a pushbutton switch.

* * * * *